Aug. 17, 1937. H. ESCHENBACHER ET AL 2,090,288
SCALE
Filed March 19, 1935 2 Sheets-Sheet 1
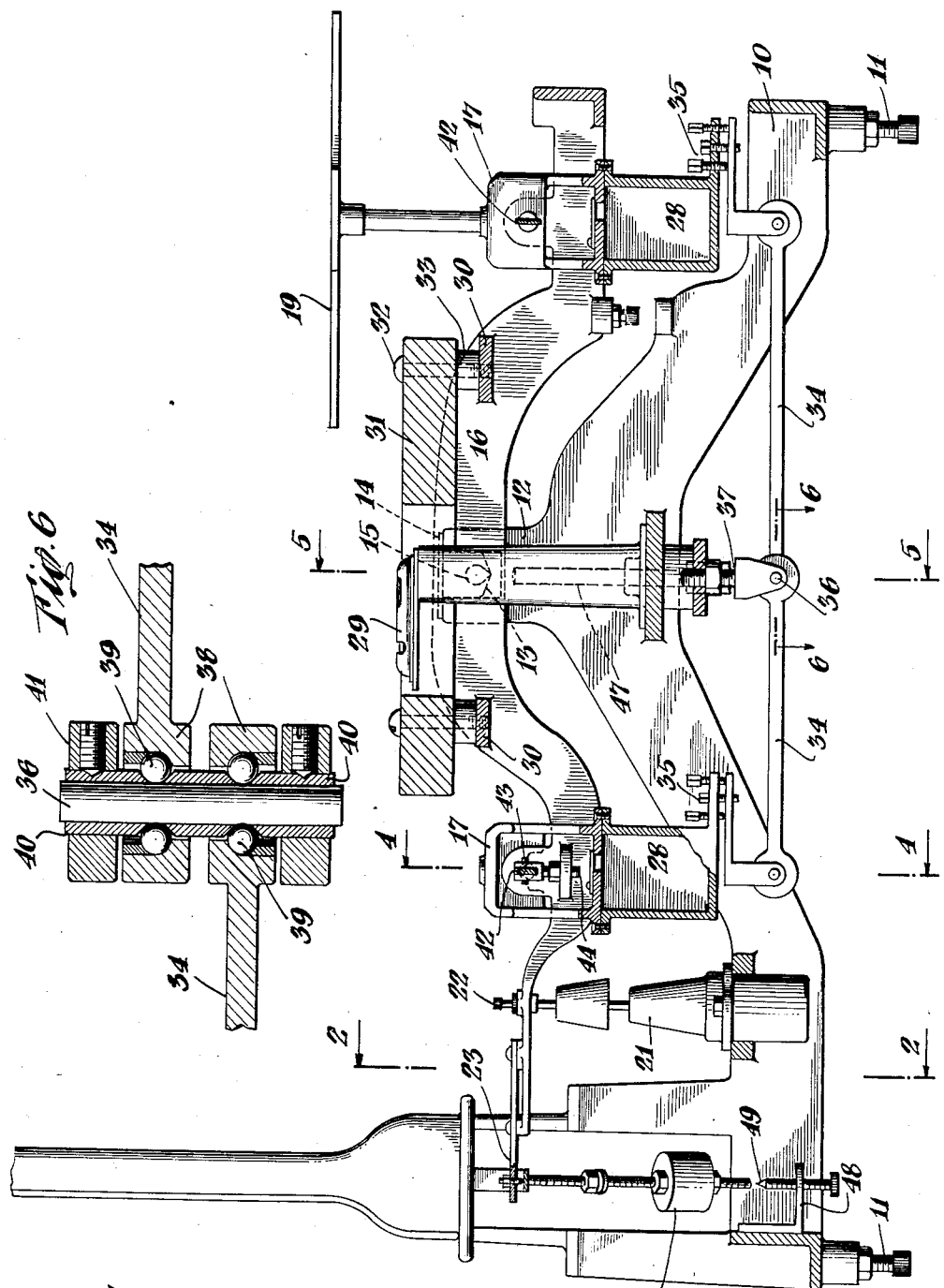
INVENTORS
*Hermann Eschenbacher*
BY *Paul J. Kircher*
Duell and Kane
ATTORNEYS

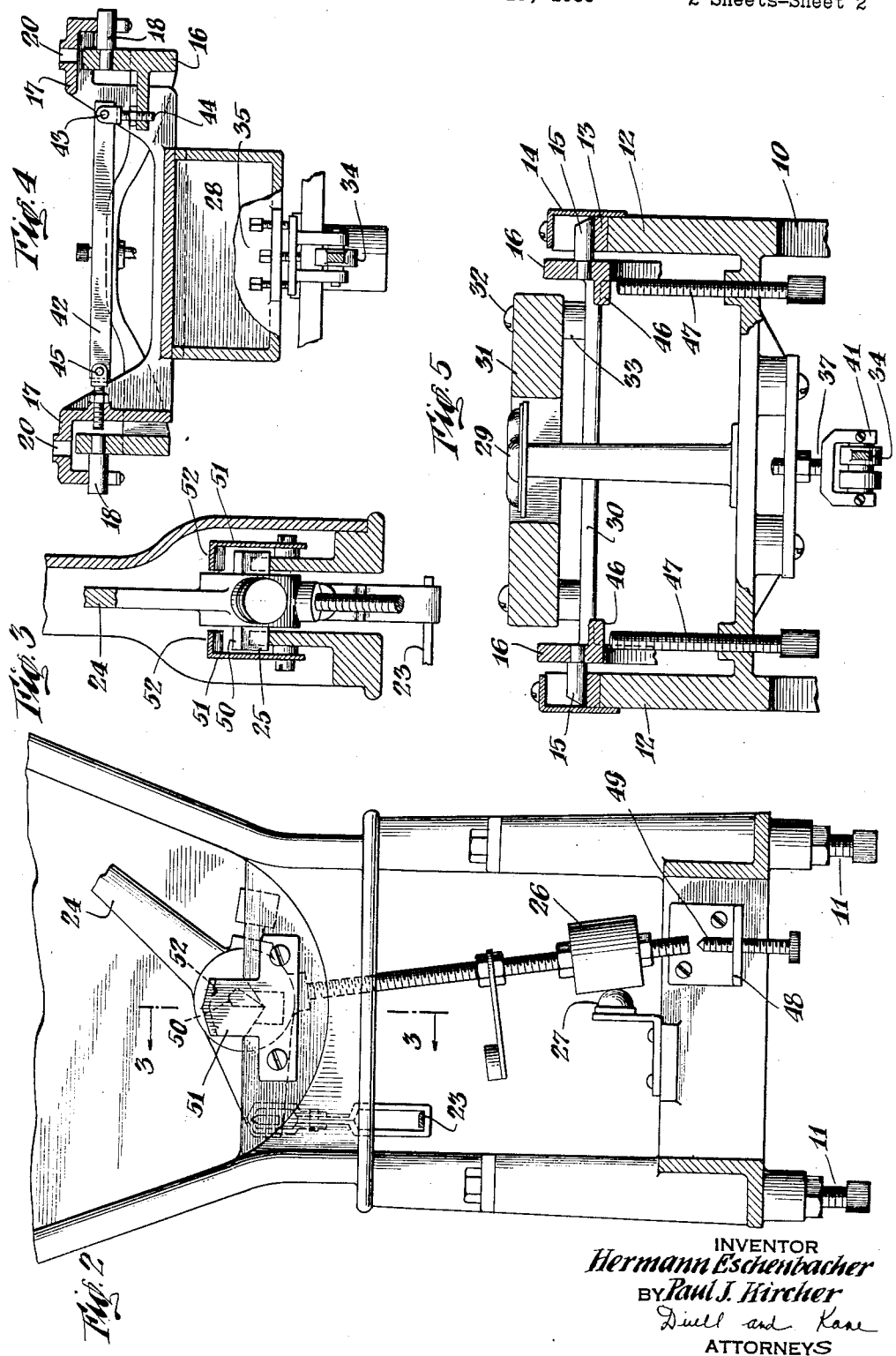

Patented Aug. 17, 1937

2,090,288

UNITED STATES PATENT OFFICE 2,090,288

SCALE

Hermann Eschenbacher, Ridgewood, and Paul J. Kircher, Brooklyn, N. Y., assignors to The Jacobs Bros. Co., Inc., Brooklyn, N. Y., a corporation of New York Application March 19, 1935, Serial No. 11,766

1 Claim. (Cl. 265—54)

This inveintion relates to a structurally and functionally improved scale.

It is an object of the invention to furnish an apparatus of this character in which the parts may readily be shifted or caused to assume an inoperative condition during periods of storage or shipment so that injury will not result to the scale mechanism during such periods.

A further object of the invention is that of furnishing a scale in which the parts may readily be properly correlated and "trued up" and in which, moreover, each scale may be adjusted so that it will embody a maximum of sensitivity.

A still further object is that of providing an apparatus of this type in which friction is reduced to a minimum, this result being achieved by an economical construction without in the slightest affecting the efficient operation of the scale.

An additional object is that of providing a scale embodying relatively few parts, each individually simple and rugged in construction, these parts being capable of ready assemblage to furnish a unitary apparatus which may be sold at a relatively nominal figure and which will operate over long periods of time with freedom from difficulties.

With these and other objects in mind, reference is had to the attached sheets of drawings, illustrating one practical embodiment of the invention, and in which—

Fig. 1 is a sectional side view of a scale embodying one form of construction within the terms of the present invention;

Fig. 2 is a transverse sectional view taken along the lines 2—2 and in the direction of the arrows as indicated in Fig. 1;

Fig. 3 is a transverse sectional view taken along the lines 3—3 and in the direction of the arrows as indicated in Fig. 2;

Figs. 4 and 5 are views similar to Fig. 2, but taken along the lines 4—4 and 5—5 respectively and in the direction of the arrows as also indicated in Fig. 1; and Fig. 6 is an enlarged sectional plan view taken along the lines 6—6 and in the direction of the arrows as indicated in Fig. 1.

In the present illustrated embodiment, the invention has been shown as embraced in a scale of the fan type. While in many respects the features of this invention are of primary utility when embraced in a scale of this character, it will be appreciated that they might be advantageously employed in scales of various other types.

With this in mind, and referring primarily to Fig. 1, it will be noted that the numeral 10 indicates a base which may be adjustably supported upon screw-threaded columns 11. This base, as shown especially in Fig. 5, has portions 12 which mount bearing blocks 13. The latter may be enclosed by guards 14 which serve the additional functions of acting as retaining means for knife edge bearing elements 15 affixed to a beam 16. These bearing elements are preferably disposed substantially intermediate the extremities of the same and the latter mounts adjacent its end portions pan supports 17, such mounting being effected by means of suitable bearings 18.

In accordance with general practice in a scale of this type, a platform 19 is associated with merely the outermost pan support. However, as will be observed in Fig. 4 the inner support 17 may also be provided with openings 20, or any other suitable structure, so that a second support may be mounted at this point, if this should be desired. In the latter case it will, of course, be understood that this support will primarily serve to receive weights which will increase the normal capacity of the scale. In fact, under certain circumstances, the platform 19 may be shifted to the innermost pan support for the purpose of weighing commodities. This, however, requires a rearrangement of the mechanism, and a consideration thereof is not material to a proper understanding of the present invention.

Preferably disposed at a point beyond the innermost pan support and mounted by the base is a dash-pot of any desired type. This unit has its stem 22 connected to the beam, which latter may be coupled in any desired manner to the registering mechanism of the scale as, for example, by employing a flexion strip 23.

The registering mechanism may include a chart (not shown) the indicia of which is traversed by a pointer 24. This pointer may be mounted by knife edge bearing elements 25, and a pendulum 26, or other movement resisting structure, may be coupled to these bearing elements and contact in its normal position a stop element 27, suitably mounted by the scale base.

With an arrangement such as the foregoing, and with no platform or its equivalent mounted by the innermost pan support, it will be understood that the scale would normally be out of balance for the reason that the platform 19 would be serving—incident to its own weight—to depress the outer end of the beam. An equivalent unbalanced condition would, of course, occur if this platform were eliminated and a platform were associated merely with the innermost pan support. Also, in no event, is it found that manufacturing methods are sufficiently exact to insure a complete balance of the parts without adjustment after such parts are assembled. With this in mind, there is associated with each of the pan supports 17 a casing, or its equivalent, 28. These casings are intended to receive a number of small weights as, for example, in the form of shot. Consequently, it is entirely feasible for an inspector, after the scale has been assembled, to bring the beam into a condition of balance by removing a certain quantity of these weights from one of the casings and/or introducing a certain amount of them into the other casing.

In a scale of this character it is almost essential that perfect weight indicating results be achieved irrespective of whether the scale base is disposed exactly in a horizontal plane or not. Of course, with a view to having the scale disposed in as nearly a perfect position as is possible, the adjustable members 11, or their equivalent, are employed, and in accordance with this invention the beam mounts at a point adjacent its bearing elements 15 a pair of spirit levels, or their equivalents, 29. These will serve to indicate when the scale is in proper position with respect to its transverse as well as its longitudinal axes. However, as afore brought out, the scale must weigh properly, even if the apparatus is not disposed in exactly a perfect position. With this in mind, and also to increase the delicacy of response on the part of the scale, the beam of the latter is provided with mounting portions 30, upon which there is disposed a mass 31 of weighty material formed of lead or other suitable metal, and which mass will lie above the center of gravity of the beam assembly. The mounting of this mass or body may be effected by screws 32, and washers 33 may encircle these screws and be interposed between the body 31 and the mountings 30, so that by substituting one washer for another the body 31 may be raised to the highest possible horizontal plane consistent with the obtaining of proper weighing results. In this manner the center of gravity may be brought to a point just below the bearing edges of the knife elements 15, which, of course, will avoid all difficulties as afore enumerated, and will at the same time furnish a structure capable of economical manufacture and adjustment.

Now in order to maintain the pan supports in their proper position, or in other words to provide for a parallel link movement which will have a minimum of detrimental friction, it will be observed that toggle bars 34 have their outer ends adjustably connected as at 35, one to each of the pan supports, and are connected adjacent their inner ends to a common shaft 36 mounted by a stem 37 adjustably secured to the base. In connection with such shaft as well as with the shafts which couple the outer ends of the beams to the adjusting structures 35, anti-friction bearings are employed. These preferably take the form of ball-race members 38 which may be integrally formed with the end portions of the bar and which enclose an annular series of balls 39. The latter are maintained in position by means of sleeves 40 having reduced or beveled end portions against the surface of which the spherical elements 39 ride. It is obvious that it will be an extremely simple matter to assemble these parts by simply associating with each of the shafts one sleeve element by forcing the same along the shaft after which it may be firmly secured in position by a washer 41 provided with a set-screw or any other suitable means. Thereafter, the portions 38 are shifted to position, and a series of spherical elements 39 are dropped into place. Finally, by forcing one or more additional sleeves 40 into position (according to whether the central shaft 36, or one of the end shafts, is involved), and by thereafter locking the parts, a complete and inexpensive anti-friction bearing is provided. This will, of course, allow the scale beam and the parts mounted thereby to move with maximum freedom and to maintain their proper relative positions.

A factor of relatively large expense heretofore existing in scales has been the necessity of providing and fitting bearing elements or structures associated with them which would prevent longitudinal shifting of the knife edge elements with respect to bearing blocks without causing detrimental friction to result. This is avoided, according to the present invention, by utilizing link elements 42 of the nature especially shown in Fig. 4, and which link elements have one of their ends pivotally connected as at 43 to a stem 44 adjustably mounted by the beam, while their opposite ends are similarly connected, as at 45, to the pan mounting elements or members 17. In this manner, without in the slightest affecting the accuracy of the scale, any transverse shifting of the beam and support with respect to each other is avoided.

Finally, in scales generally, it has been found that if they are not used for a long period of time, or especially if they are to be shipped, the bearings may be damaged if the knife edge elements remain in continuous contact with the bearing blocks. To avoid difficulties in this connection, the present invention proposes that the beam 16 be furnished with suitable supporting portions 46, and that the base be provided with screw threaded apertures for mounting bolts 47, the ends of which are disposed in line with the portions 46. Of course, numerous functionally equivalent structures might be employed, but in any event it will be understood that by means of the present invention, an operator, by simply projecting the bolts 47, may lift and maintain the beam 16 in such a position that its knife edge elements 15 are out of contact with the blocks 13. Moreover, and as shown especially in Fig. 2, the base may be additionally provided with a mounting 48, supporting a screw-threaded bolt 49, the end of which normally projects in line with the arm of the pendulum 26 or any other equivalent portion of the mechanism. The knife edge elements 25 may have their upper ends beveled as at 50, and the shield members 51 for such bearing elements may have their upper inner surfaces 52 converging. Accordingly, if the bolt 49 is projected to a sufficient extent it will contact the pendulum arm and exert a thrust on the same adequate to lift the bearing elements 25 from their normal positions and to a point at which their upper edges will contact the inner edges of surfaces 52 and be guided by the same to the point of juncture of such surfaces. At that point the entire registering mechanism will be locked against movement aside from the fact that the bearing elements 25 will, of course, be out of contact with the surfaces which they normally engage.

From the foregoing it will be understood that, among others, the several objects of the invention as specifically aforenoted, are achieved. It will additionally be appreciated that numerous changes in construction and rearrangement of the parts might be resorted to without departing from the spirit of the invention as defined by the claim.

Having thus described the invention, what is claimed is:

A scale including in combination a base, a beam rockingly mounted thereby, pan supports rockingly connected to such beam and to different sides of the point of rocking mounting thereof, links extending transversely of such beam and pan supports, means for pivotally connecting opposite ends of such links to the beam and each support, and means for adjusting such points of pivotal connection.

PAUL J. KIRCHER.
HERMANN ESCHENBACHER.